United States Patent [19]

Zissimopoulos

[11] 4,266,697

[45] May 12, 1981

[54] CONTROLLED VOLUME LIQUID METER DEFINING IMPROVED PLUNGER MEANS

[75] Inventor: Nicholas Zissimopoulos, Schaumberg, Ill.

[73] Assignee: Baxter Travenol Laboratories, Inc., Deerfield, Ill.

[21] Appl. No.: 19,391

[22] Filed: Mar. 12, 1979

[51] Int. Cl.³ .............................................. A61M 5/14
[52] U.S. Cl. ........................................ 222/450; 251/7
[58] Field of Search ........................................ 251/4–9; 222/444, 450, 451, 528

[56] References Cited

U.S. PATENT DOCUMENTS

| 1,993,442 | 3/1935 | Greven | 251/6 UX |
| 2,565,903 | 8/1951 | Zellweger | 251/4 X |
| 4,121,584 | 10/1978 | Turner et al. | 222/207 X |

*Primary Examiner*—David A. Scherbel

*Attorney, Agent, or Firm*—Paul C. Flattery; John P. Kirby, Jr.; Garrettson Ellis

[57] ABSTRACT

A controlled volume liquid meter comprises a liquid metering chamber defined between a rigid wall and an opposed flexible membrane wall. Inlet and outlet ports are positioned adjacent the ends of the chamber with the ports defining paths of liquid flow therethrough which are transverse to the direction of liquid flow in the chamber. A pair of plunger members are provided, along with apparatus for alternatingly pressing the plunger members against the membrane wall and inserting the plunger members into the inlet and outlet ports to alternatingly open and close them. In accordance with this invention, the plunger members permit variation of the length of each plunger member, with a spring urging the plunger members to occupy their maximum lengths. As a result of this, the force with which the plunger members press against the membrane wall is limited to a value governed by the spring.

6 Claims, 3 Drawing Figures

CONTROLLED VOLUME LIQUID METER DEFINING IMPROVED PLUNGER MEANS

BACKGROUND OF THE INVENTION

A problem in the field of parenteral solution administration is that the conventional solution administration equipment is sometimes insufficiently inaccurate in its capability to administer small, precise quantities of solutions over a period of time. A chief reason for this is the problem of "cold flow" in the polyvinyl chloride solution tubing, which tends to change its dimensions under the pressure of a flow control clamp.

Attempts have been made to provide improved accuracy of parenteral solution delivery, especially at low flow rates, by means of pumped infusion systems in which the volume of solution passing to the patient is positively controlled by a pump. However, a disadvantage of this is that it is imperative for the device to be fail-safe, to avoid pumping air into an unattended patient.

In U.S. Pat. No. 4,121,584 of Turner, et al., another method and apparatus for controlling and dispensing of fluid is disclosed. Basically, an expansible volume chamber of predetermined maximum volume is equipped with an inlet and an outlet, and valves controlling flow through the inlet and outlet. This structure, when used in conjunction with parenteral solution delivery equipment for example, can provide predetermined, metered quantities of solution to the patient, while the solution administration proceeds by usual gravity head, to provide safety combined with precision volume administration.

The flow rate of solution administration is controlled by sequentially opening and closing the inlet and outlet valves. When the inlet valve is opened and the outlet valve is closed, the expansible chamber fills. Then the inlet valve is closed and the outlet valve is opened to allow the expansible chamber to drain the administration solution to the patient. The rate of administration is controlled by the timing of the opening of the upper and lower valves.

Numerous patent applications have been filed representing improvements on the invention of the Turner patent cited above, including the application of William L. Rudzena, Ser. No. 951,104 filed Oct. 13, 1978 entitled "CONTROLLED VOLUME LIQUID METER, PARTICULARLY FOR PARENTERAL SOLUTION ADMINISTRATION", now abandoned. There, the portions of the membrane which are pressed into sealing relation by the plunger with the inlet and outlet for valving action are reinforced with an additional, resilient pad member carried by the membrane wall, for reinforcing of the membrane wall. This prevents rupturing of the membrane when the plungers impinge the membrane wall against the respective inlet or outlet port where it joins the chamber, so that the membrane becomes a seal.

As an advantage of this invention, the plunger is modified so that only a predetermined amount of force can be applied by the plunger onto the membrane. Accordingly, the membrane at the inlet and the outlet can be treated in more gentle manner by the plungers, which permits the elimination of the resilient pad members, while still providing an excellent membrane life for preferably at least 24 hours continuous operation of the device of this invention, without need to replace the membrane.

Accordingly, while the reliability and life of the membrane is increased, the cost of manufacture is decreased, since there is no need for inspection to confirm the proper installation of the pads, which may be dispensed with by this invention. However, if desired, the reinforcing pads may be retained under circumstances where exceptionally long-term operation is desired.

DESCRIPTION OF THE INVENTION

This application relates to a controlled volume liquid meter which comprises a controller member, typically defining an aperture for emplacement of a casette. The casette defines a housing which includes a variable volume liquid metering chamber having a flexible membrane wall. An inlet port is positioned adjacent one end of the metering chamber and an outlet port is positioned adjacent the other end of the metering chamber. The inlet and outlet ports define paths of liquid flow therethrough which are transverse to the direction of liquid flow in the chamber, and are also transverse to the membrane.

The controller member which receives the casette includes a pair of plunger members, and is equipped with means for alternatingly pressing the plunger members against the membrane wall in the casette by alternatingly inserting the plunger members into the inlet and outlet ports. The effect of this is to alternatingly open and close the inlet and outlet ports.

In accordance with this invention, the plunger members possess means permitting variation of the length of each plunger member between a maximum and a minimum length. Spring means are provided urging the plunger members to occupy their maximum lengths. Accordingly, the force with which the plunger members press against the membrane wall is limited to a value governed by the spring means.

The spring means may then be appropriately selected to exert force on compression which is sufficient to press the membrane into sealing relation with the inlet and outlet, while at the same time being of insufficient magnitude to damage the membrane. The result of this is the greatly increased assurance of long-term operation of the membrane utilized herein as a seal without rupture.

The plunger members are typically carried on a pivotable member which is pivoted by an electromagnetic controller to alternatingly advance and retract the plungers as desired. The pivotable member which carries the plungers is desirably a spring member, which is deflectable in the direction of the axis of the plungers, to provide a small amount of "play" in the system.

The plungers typically comprise a sleeve which is carried by the spring member, the sleeve having a closed end and an open end. A plunger head resides partially in the open end and extends outwardly therefrom, being axially slidable with respect to the sleeve member and retained therein. A spring is typically positioned within the sleeve to urge the plunger head to its outwardmost position.

Figure 1:
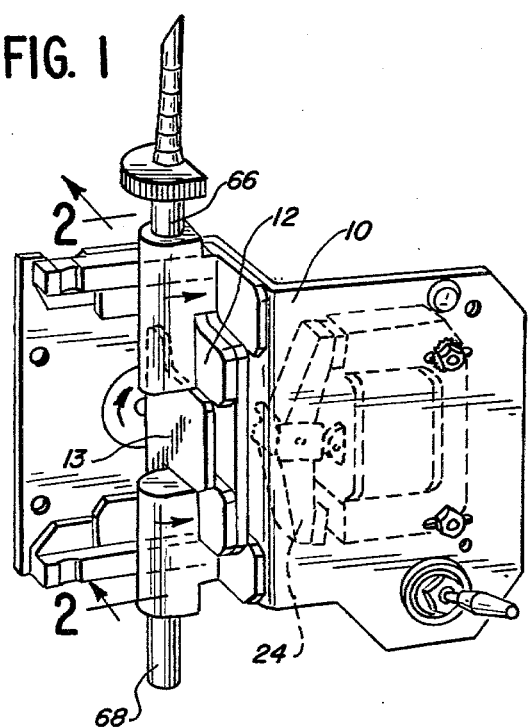
FIG. 1 is a perspective view of the improved controlled volume liquid meter of this invention, which may be used in conjunction with conventional parenteral solution administration equipment for the administration of solution to a patient with precision and safety.

Referring to the drawings, a controlled volume liquid meter system is shown to meter the gravity flow of liquid passing through it. The system as shown includes a housing 10 which receives, holds and operates a disposable casette 12 in a manner similar to the disclosure of the pending application of Nicholas Zissimopoulous, Ser. No. 878,970, filed Feb. 17, 1978, entitled: "IMPROVED FLUID-FLOW LIMITING APPARATUS FOR USE WITH INTRAVENOUS SOLUTION ADMINISTERING EQUIPMENT" now U.S. Pat. No. 4,185,759.

Casette 12 defines a variable volume liquid metering chamber which, in turn, is defined by a rigid wall 16 of casette 12 and a flexible membrane wall 18, sealed at its end to the rigid portions of the casette. Membrane wall 18 may be made of polyvinyl chloride plastic, for example.

As described in the patent application cited immediately above, casette 12 may be installed in housing 13, and then drawn into engaged relationship with the plunger members as shown therein.

E-frame electromagnet switch 22 defines a pivoting member 24 which includes a leaf spring member 26 which, in turn, carries plungers 28, 30. Electromagnet 23 operates to move pivoting member 24, which carries permanent magnets 25, 27 of opposite outwardly-facing polarity, so that member 24 moves between its positions in response to the imposed polarity of electromagnet 23, as described in the previously cited Zissimopoulous pending application.

An inlet port 32 is defined in casette 12 adjacent one end of the chamber 14, while an outlet port 34 is defined in the casette adjacent the other end of chamber 14. The inlet and outlet ports 32, 34 define paths of liquid flow 36, 38 which are transverse to the direction of flow 40 in chamber 14 and are also transverse to membrane 18.

The E-frame switch 22 serves as the means for alternatingly moving rocking arm pivoting member 24 between two positions for pressing the plunger members 28, 30 against membrane wall 18, and alternatingly inserting the plunger members into the inlet and outlet ports 32, 34. The result of this is to alternatingly open and close the inlet ports in known manner, to permit the operation of a controlled liquid volume meter, with the rate of administration of liquid being dependent upon the rate of switching of the positions of plungers 28, 30, for filing and emptying chamber 14.

Figure 3:
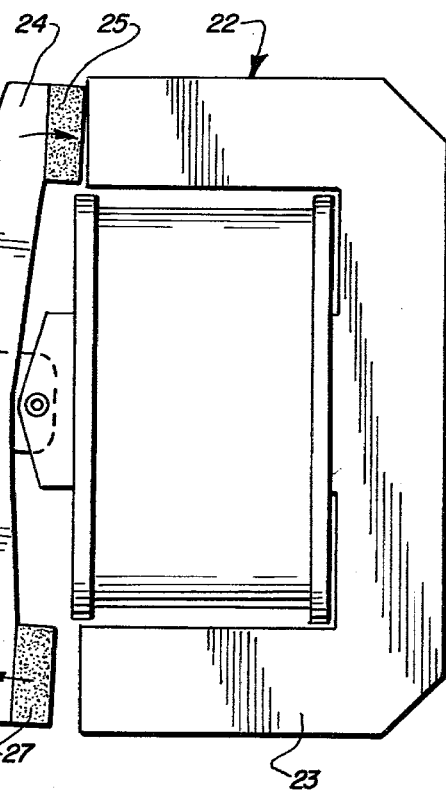
FIG. 3 is an enlarged longitudinal sectional view of a plunger as shown in FIG. 2.

In accordance with this invention, plunger members 28, 30 each possess means permitting variation of their lengths between a maximum and a minimum length. As shown in FIG. 3, each plunger member defines a sleeve 50 which is carried by leaf spring member 26. Sleeve 50 defines a closed end 52 which, in turn, defines an annular groove 54 into which a slot of leaf spring 26 can engage, to carry each plunger 28, 30.

Plunger head 56 defines a rounded front end 58, and is carried in the open end of sleeve 50, to project outwardly as shown. Sleeve 50, in turn, defines a rolled tip 58 of constricted diameter, which is capable of engaging rear flange 60 of the plunger head, to capture the plunger head within the sleeve. At the same time, plunger head 56 can move axially forwardly and rearwardly with respect to sleeve 50.

Inner, annular step 62 of sleeve 50 limits the shortening of the plunger to a predetermined length, while the interaction of rolled front end 58 and flange 60 limits the lengthening of the plunger to a predetermined length.

Spring 64 is positioned within the bore of sleeve 50, and is adapted to urge plunger head 56 outwardly to the maximum length configuration of the plunger.

Figure 2:
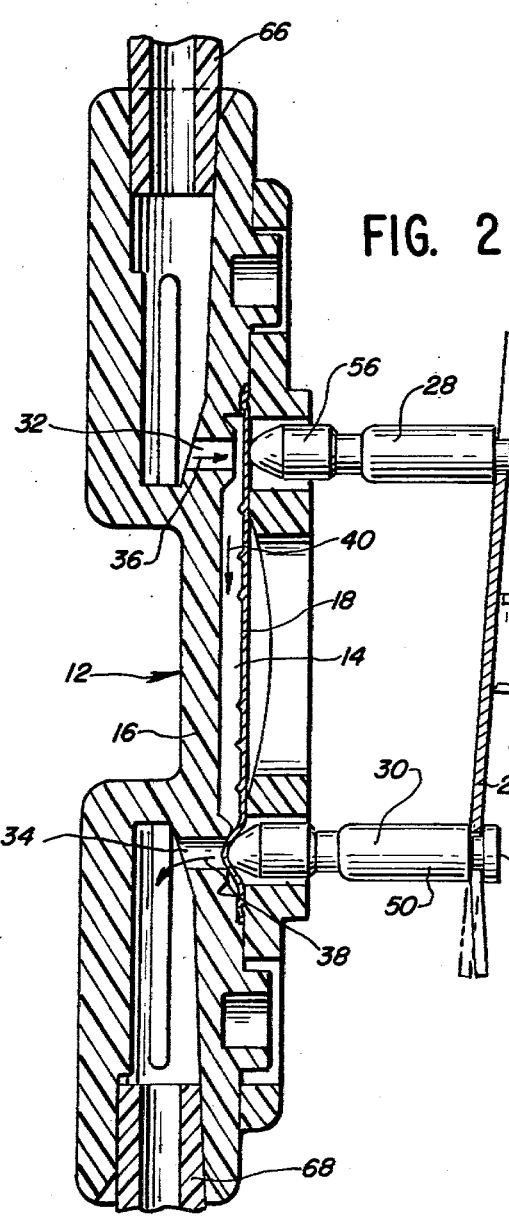
FIG. 2 is an enlarged elevational view, taken in part in vertical section along line 2—2 of FIG. 1, showing the working parts of the device of FIG. 1, with other parts removed for clarity of disclosure.

As a result of this, it can be seen that when a plunger 28, 30 presses membrane 18 into sealing relation with either the inlet 32 or the outlet 34, the compressive force imposed upon the membrane will be normally limited to a value which is governed by spring 64. Preferably, it is contemplated that the plungers 28, 30 will be moved by the rocking of pivoting member 24 and leaf spring 26 a total distance of travel of about 0.02 to 0.04 inch, and specifically, 0.028 to 0.03 inch. When a plunger is in its flow-blocking configuration, as is plunger 30 in FIG. 2, it is specifically contemplated that the plunger may be slightly compressed from its maximum length by specifically about 0.005 inch.

It is further specifically contemplated that the initial bias force of spring 64 is selected to be such that any compression force in excess of 40 to 100 grams and typically 50 grams causes either plunger 28, 30 to begin to shorten in length. After essentially 0.005 inch of collapse has taken place, the compression force of spring 64 is typically selected to be 50 to 70 grams, for example 57 grams. After a collapse of 0.01 inch has taken place, the compression force necessary to further compress spring 64 may typically be about 64 grams.

A spring 64 having a spring constant of about 3.16 to 3.17 pounds per inch has been found to be suitable for use in this invention, and specifically a spring constant of 3.165 pounds per inch.

Inlet tubing 66 communicates with inlet port 32 at one end, and may constitute a conventional upper portion of an administration set for providing sterile parenteral solution to a patient. Specifically, tubing 66 may be the spike of the set for penetrating a solution source.

Flexible tubing 68, downstream from the device of this invention, may constitute the remaining portion of a conventional administration set, carrying usually a clamp, an auxiliary medication administration site, and a luer for receiving an intravenous needle for access to the venous system of a patient, with tubing 68 communicating with outlet port 34.

In this embodiment, casette 12 constitutes a part of the administration set which is typically disposable, while housing 10, containing E-frame switch 22 and plungers 28, 30, are generally contemplated to constitute reusable portions of the system.

Accordingly, a precise-dosage liquid administering set which utilizes gravity as the force for administering the liquid is provided, having improved simplicity and long-lived reliability of operation.

The above has been offered for illustrative purposes only, and is not intended to limit the invention of this application, which is as defined in the claims below.

That which is claimed is:

1. In a controller for a controlled volume liquid meter defining aperture means for receiving a cassette which includes a variable volume liquid metering chamber having a flexible membrane wall, an inlet port adjacent one end of said chamber, an outlet port adjacent the other end of said chamber, the inlet and outlet ports defining paths of liquid flow therethrough which are transverse to the direction of liquid flow in said chamber, said controller defining a pair of plunger members, and means for alternatingly pressing the plunger members against said membrane wall to alternatingly open and close said inlet and outlet ports, the improvement comprising, in combination:

said plunger members being carried by a leaf spring member which is deflectable in the direction of the axis of said plunger members, said plunger members also possessing means permitting variation of the length of each plunger member between a maximum and a minimum length, and spring means urging said plunger members to occupy their maximum lengths, whereby the force with which said plunger members press against the membrane wall is limited to a value governed by said spring means, each plunger member comprising a sleeve open at one end and closed at another end, and a plunger head carried in the bore of said sleeve and slidably movable therein, a forward portion of said plunger head projecting outwardly from the bore of said sleeve, and spring means between said plunger head and the closed end of said sleeve for biasing said plunger head into an axially outward position with respect to said sleeve, said plunger head further defining a first flange positioned adjacent its rear end, said sleeve defining a second flange extending radially inwardly from its open mouth, whereby said second flange prevents removal of said plunger head from the sleeve by engagement with the first flange.

2. The controlled volume liquid meter of claim 1 in which said spring means, at the maximum length position of said plunger, exerts a bias force of 40 to 100 grams.

3. The controlled volume liquid meter of claim 1 in which said means for alternatingly pressing said plunger members against the membrane wall are adapted to press said plungers with sufficient force as to cause the shortening of said plunger member during said compression by 0.005 inch to exert a maximum force of 50 to 70 grams on said membrane wall.

4. A controlled volume liquid meter which comprises a variable volume liquid metering chamber having a flexible membrane wall;

an inlet port and an outlet port, said inlet and outlet ports defining paths of liquid flow therethrough, a pair of plunger members, and means for alternatingly pressing said plunger members against said membrane wall to alternatingly open and close said inlet and outlet ports, the improvement comprising:

said plunger members being carried by a leaf spring member which is deflectable in the direction of the axis of said plunger members, said plunger members also possessing means permitting variation of the length of each plunger member between a maximum and a minimum length, and spring means urging said plunger members to occupy their maximum lengths, whereby the force with which said plunger members press against said spring membrane wall is limited to a value governed by said spring means, each plunger member comprising a sleeve open at one end and closed at another end, and a plunger head carrying the bore of said sleeve slidably movable therein, a forward portion of said plunger head projecting outwardly from the bore of said sleeve, and spring means between said plunger head and the closed end of said sleeve for biasing said plunger head into an axially outward position with respect to said sleeve, said plunger head further defining a first flange positioned adjacent its rear end, said sleeve defining a second flange extending radially inwardly from its open mouth, whereby said second flange prevents removal of said plunger head from the sleeve by engagement with the first flange.

5. The controlled volume liquid meter of claim 4 in which said spring means, at the maximum length position of said plunger, exerts a bias force of 40 to 100 grams.

6. The controlled volume liquid meter of claim 5 in which said means for alternatingly pressing said plunger members against the membrane wall are adapted to press said plungers with sufficient force as to cause the shortening of said plunger member during said compression by 0.005 inch to exert a maximum force of 50 to 70 grams on said membrane wall.

* * * * *